(12) United States Patent
Grothmann et al.

(10) Patent No.: US 7,464,061 B2
(45) Date of Patent: Dec. 9, 2008

(54) METHOD, COMPUTER PROGRAM WITH PROGRAM CODE MEANS, AND COMPUTER PROGRAM PRODUCT FOR DETERMINING A FUTURE BEHAVIOR OF A DYNAMIC SYSTEM

(75) Inventors: Ralph Grothmann, München (DE); Christoph Tietz, Ottobrunn (DE); Hans-Georg Zimmermann, Stamberg/Percha (DE)

(73) Assignee: Siemens Aktiengesellschaft, Munich (DE)

( * ) Notice: Subject to any disclaimer, the term of this patent is extended or adjusted under 35 U.S.C. 154(b) by 374 days.

(21) Appl. No.: 10/558,623

(22) PCT Filed: Apr. 7, 2004

(86) PCT No.: PCT/EP2004/050468

§ 371 (c)(1),
(2), (4) Date: Nov. 28, 2005

(87) PCT Pub. No.: WO2004/107066

PCT Pub. Date: Dec. 9, 2004

(65) Prior Publication Data

US 2007/0022062 A1 Jan. 25, 2007

(30) Foreign Application Priority Data

May 27, 2003 (DE) .............................. 103 24 045

(51) Int. Cl.
*G06E 1/00* (2006.01)
*G06E 3/00* (2006.01)
*G06F 15/18* (2006.01)
*G06G 7/00* (2006.01)
*G06N 3/02* (2006.01)

(52) U.S. Cl. ........................................ 706/15; 706/21

(58) Field of Classification Search ................... None
See application file for complete search history.

(56) References Cited

U.S. PATENT DOCUMENTS

| 5,461,699 | A |   | 10/1995 | Arabi et al. |
|---|---|---|---|---|
| 5,493,631 | A | * | 2/1996 | Huang et al. .................. 706/23 |
| 5,521,813 | A |   | 5/1996 | Fox et al. |
| 5,586,033 | A | * | 12/1996 | Hall ............................ 701/50 |

(Continued)

FOREIGN PATENT DOCUMENTS

WO        WO 00/08599        2/2000

(Continued)

OTHER PUBLICATIONS

Nonlinear Francis Hydroturbine Generator Set Neural Network Model Predict Control Jiang Chang; Yan Peng; Machine Learning and Cybernetics, 2006 International Conference on Aug. 2006 pp. 2963-2968 Digital Object Identifier 10.1109/ICMLC.2006.259147.*

(Continued)

*Primary Examiner*—Michael B Holmes
(74) *Attorney, Agent, or Firm*—Staas & Halsey LLP

(57) ABSTRACT

An approximation is determined for the future system behavior by a similarity analysis using a previously known behavior of the dynamic system, whereupon the future system behavior is determined by using the approximation for the future behavior of the dynamic system as well as a neuronal network structure, especially a causal retro-causal network (causality analysis).

21 Claims, 8 Drawing Sheets

U.S. PATENT DOCUMENTS

| | | | | |
|---|---|---|---|---|
| 5,813,798 | A | * | 9/1998 | Whiffen ................. 405/52 |
| 5,873,251 | A | | 2/1999 | Iiono |
| 6,047,221 | A | * | 4/2000 | Piche et al. ................ 700/44 |
| 6,056,781 | A | * | 5/2000 | Wassick et al. ............. 703/12 |
| 6,063,028 | A | * | 5/2000 | Luciano .................. 600/300 |
| 6,151,566 | A | * | 11/2000 | Whiffen ................. 703/10 |
| 6,157,894 | A | * | 12/2000 | Hess et al. ................. 702/54 |
| 6,185,470 | B1 | * | 2/2001 | Pado et al. ................ 700/104 |
| 6,207,936 | B1 | * | 3/2001 | de Waard et al. .......... 219/497 |
| 6,278,899 | B1 | * | 8/2001 | Piche et al. ................ 700/44 |
| 6,317,731 | B1 | * | 11/2001 | Luciano .................. 706/21 |
| 6,373,033 | B1 | * | 4/2002 | de Waard et al. .......... 219/497 |
| 6,381,504 | B1 | * | 4/2002 | Havener et al. ............ 700/44 |
| 6,493,691 | B1 | | 12/2002 | Neuneier et al. |
| 6,505,475 | B1 | * | 1/2003 | Zugibe et al. .............. 62/192 |
| 6,728,691 | B1 | | 4/2004 | Neuneier et al. |
| 6,732,052 | B2 | * | 5/2004 | Macdonald et al. .......... 702/6 |
| 6,850,871 | B1 | * | 2/2005 | Barford et al. .............. 703/2 |
| 6,876,930 | B2 | * | 4/2005 | Murray et al. ............... 702/19 |
| 6,950,711 | B2 | * | 9/2005 | Havener et al. ............ 700/28 |
| 7,058,617 | B1 | * | 6/2006 | Hartman et al. ............ 706/16 |
| 7,059,143 | B1 | * | 6/2006 | Zugibe et al. .............. 62/192 |
| 7,086,240 | B1 | * | 8/2006 | Zugibe et al. .............. 62/114 |
| 7,172,037 | B2 | * | 2/2007 | Dashevskiy et al. .......... 175/25 |
| 7,206,699 | B2 | * | 4/2007 | Larder et al. ............... 702/19 |
| 7,213,006 | B2 | * | 5/2007 | Hartman et al. ............ 706/16 |
| 7,315,846 | B2 | * | 1/2008 | Hartman et al. ............ 706/16 |
| 2004/0030663 | A1 | | 2/2004 | Erdem et al. |
| 2007/0255461 | A1 | * | 11/2007 | Brickfield et al. .......... 700/295 |

FOREIGN PATENT DOCUMENTS

| WO | WO 00/55809 | 9/2000 |
|---|---|---|
| WO | WO 02/27620 | 4/2002 |
| WO | WO 02/27654 | 4/2002 |

OTHER PUBLICATIONS

The role of neural networks in the study of the posterior parietal cortex Mazzoni, P.; Andersen, R.A.; Neural Networks, 1993., IEEE International Conference on Mar. 28-Apr. 1, 1993 pp. 1321-1326 vol. 3.*

Artificial neural network-based method for transient response prediction Auckland, D.W.; Pickup, I.E.D.; Shuttleworth, R.; Zhou, C.; Generation, Transmission and Distribution, IEE Proceedings-vol. 142, Issue 3, May 1995 pp. 323-329.*

An LTCC design technique based on accurate component models and EM simulations Napijalo, V.; Young, T.; Costello, J.; Conway, K.; Kearney, D.; Humphrey, D.; Verner, B.; Microwave Conference, 2003. 33rd European vol. 1, Oct. 7-9, 2003 pp. 415-418 vol. 1.*

An LTCC Design Technique Based on Accurate Component Models and EM Simulations Napijalo, Veljko; Young Thomas; Costello, John; Conway, Kieran; Kearney, David; Humphrey, Denver; Verner, Billy; European Microwave Conference, 2003. 33$^{rd}$ Oct. 2003 pp. 415-418 Digital Object Identifier 10.1109/EUMA.2003.340978.*

Online data-driven fuzzy modeling for nonlinear dynamic systems Wan-Jun Hao; Wen-Yi Qiang; Qing-Xuan Chai; Jie-Lai Tang; Machine Learning and Cybernetics, 2005. Proceedings of 2005 International Conference on vol. 5, Aug. 18-21, 2005 pp. 2634-2639 vol. 5 Digital Object Identifier 10.1109/ICMLC.2005.1527389.*

S. Haykin, Neural Networks: A Comprehensive Foundation, Prentice Hall, Second Edition, ISBN 0-13-273350-1, pp. 732-789,1999.

David E. Rumelhart et al., Parallel Distributed Processing, Explorations in the Microstructure of Cognition, vol. 1: Foundations, A Bradford Book, The MIT Press, Cambridge, Massachusetts, London, England, 1987.

H. Rehkugler und H. G. Zimmermann, Neuronale Netze in der Ökonomie, Grundlagen und finanzwirtschaftliche Anwendungen, Verlag Franz Vahien München, ISBN 3-8006-1871-0, pp. 3-90, 1994.

Zimmermann H.G., Neuneier R., Grothmann R., Modelling of Dynamic Systems by Error-Correction-Neural-Networks, in Soofe and Cao (Eds.), Forecasting Financial Data, Kluwer Verlag ISBN 0792376803, 2002.

Nazarko J. et al: "Application of Statistical and Neural Approaches to the Daily Load Profiles Modelling in Power Distribution Systems", 1999 IEEE Transmission and Distribution Conference. New Orleans, LA, Apr. 11-16, 1999, IEEE Transmission and Distribution Conference, New York, NY: IEEE, US, vol. 1, Apr. 11, 1999, pp. 320-325, XP00095041.

Yu-fei Tan et al., "Applying BP Artificial Neural Network to Forecast Urban Gas Short-term Load", 1994-2007, China Academic Journal Electronic Publishing House, Jun. 30, 2001.

* cited by examiner

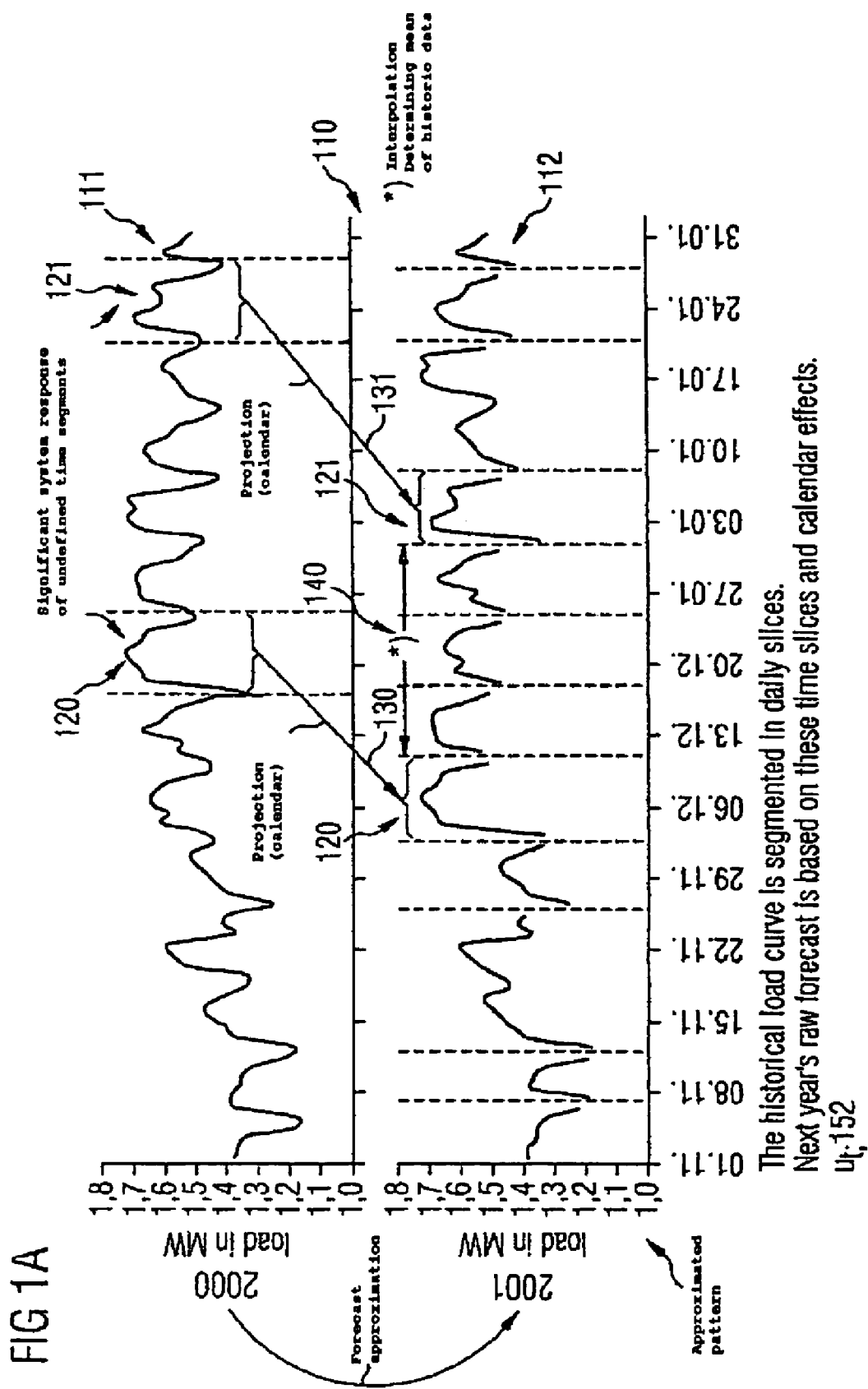

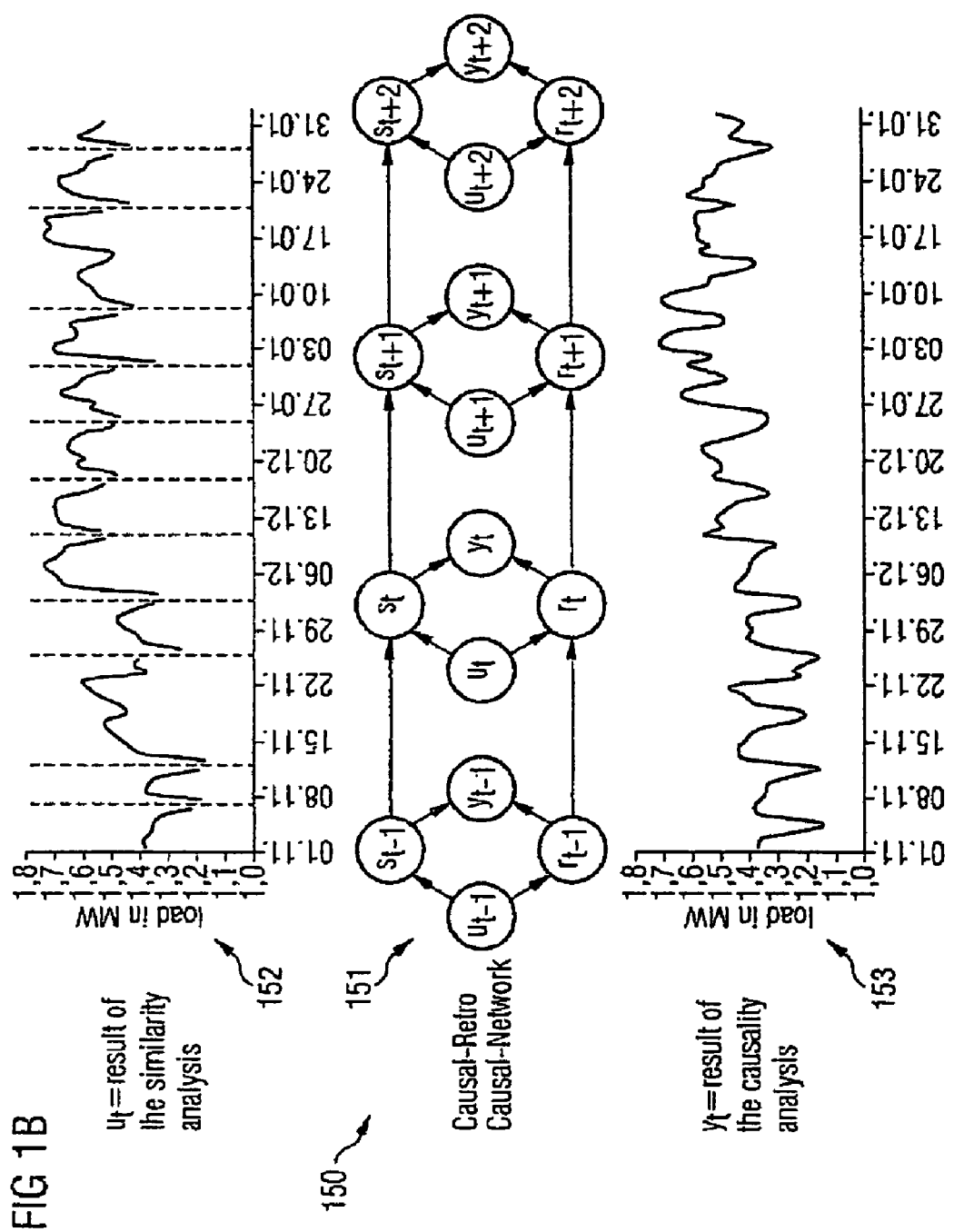

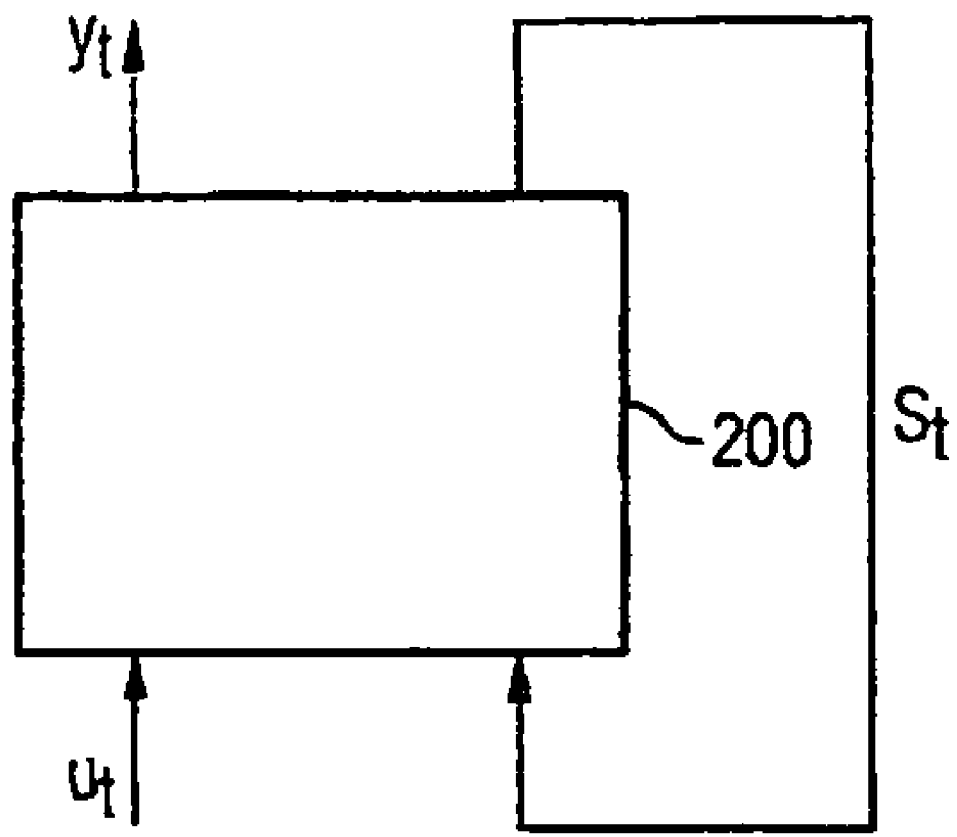

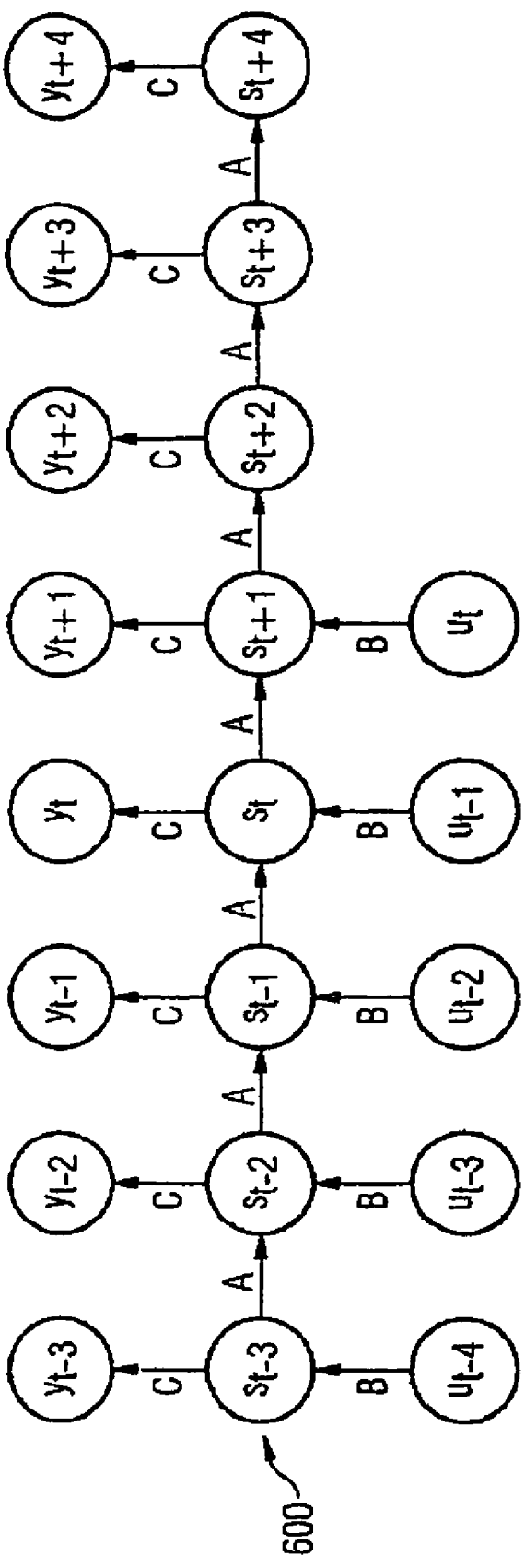

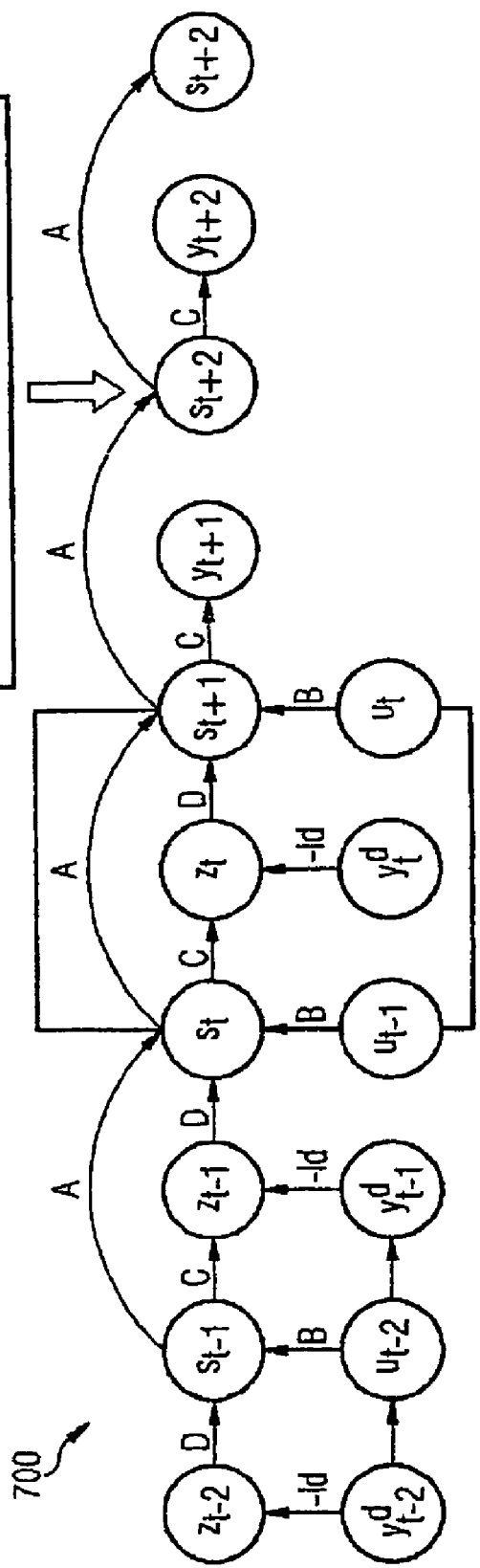

METHOD, COMPUTER PROGRAM WITH PROGRAM CODE MEANS, AND COMPUTER PROGRAM PRODUCT FOR DETERMINING A FUTURE BEHAVIOR OF A DYNAMIC SYSTEM

CROSS REFERENCE TO RELATED APPLICATIONS

This application is based on and hereby claims priority to PCT Application No. PCT/EP2004/050468 filed on Apr. 7, 2004 and German Application No. 10324045.4 filed on May 27, 2003, the contents of which are hereby incorporated by reference.

BACKGROUND OF THE INVENTION

The invention relates to a method and a computer program with program code for determining a future system response of a dynamic system.

It is known from S. Haykin, "Neural Networks: A Comprehensive Foundation," Prentice Hall, Second Edition, ISBN 0-13-273350-1, pages 732-789, 1999 ("the Haykin reference") that a neural structure, for example a neural network, can be used to describe and model a dynamic system or dynamic process and its process response.

Generally a dynamic system or dynamic process is described by a status transition description that is not visible to an observer of the dynamic process and an output equation that describes observable quantities of the technical dynamic process.

Such a process response of a dynamic process is shown in FIG. 2.

The dynamic process 200 or dynamic system 200, in which the dynamic process operates, is subject to the influence of an external input quantity u of predefinable dimension, with an input quantity $u_t$ at a point in time t being referred to as:

$$u_t \in \Re^l,$$

where l refers to a natural number.

The input quantity at a point in time t causes a change in the dynamic process.

An internal status $s_t$ ($s_t \in \Re^m$) of predefinable dimension m at a point in time t cannot be observed by an observer of the dynamic system 200.

A status transition of the internal status $s_t$ of the dynamic process is caused as a function of the internal status $s_t$ and the input quantity $u_t$ and the status of the dynamic process switches to a successor status $s_{t+1}$ at a subsequent point in time t+1.

The following is thereby valid:

$$S_{t+1} = f(s_t, u_t). \quad (1)$$

where f(.) refers to a general mapping rule.

An output quantity $y_t$ that can be observed by an observer of the dynamic system 200 at a point in time t is a function of the input quantity $u_t$ and the internal status $s_t$.

The output quantity $y_t$ ($y_t \in \Re^n$) is a predefinable dimension n.

The dependency of the output quantity $y_t$ on the input quantity $u_t$ and the internal status $s_t$ of the dynamic process is defined by the following general rule:

$$y_t = g(s_t), \quad (2)$$

where g. refers to a general mapping rule.

To describe the dynamic system 200 in the Haykin reference a neural structure is used comprising computer elements connected to one another in the form of a neural network of neurons connected to one another. The connections between the neurons of the neural network are weighted. The weightings of the neural network are combined in a parameter vector v.

An internal status of a dynamic system that underlies a dynamic process is thus a function, according to the following rule, of the input quantity $u_t$ and the internal status of the preceding point in time $s_t$ and the parameter vector v:

$$s_{t+1} = NN(v, s_t, u_t) \quad (3)$$

where NN(.) refers to a mapping rule predefined by the neural network.

This description of the dynamic system 200 according to equation (3) is also referred to as the forecast approach.

Alternatively the dynamic system can also be described by:

$$s_t = f(s_{t-1}, u_t) \quad (1')$$

with $$s_t = NN(v, s_{t-1}, u_t) \quad (3')$$

which is referred to as the consistency approach. The forecast approach and consistency approach result in minor structural differences in the respective network structures but are equivalent, alternative forms of description for dynamic systems.

A further neural structure to describe the dynamic system 200, a neural network referred to as a time delay recurrent neural network (TDRNN), is known from David E. Rumelhart et al., "Parallel Distributed Processing, Explorations in the Microstructure of Cognition", vol. 1: Foundations, A Bradford Book, The MIT Press, Cambridge, Mass., London, England, 1987 ("David E. Rumelhart et al.").

The known TDRNN is shown in FIG. 5 as a neural network 500 developed over a finite number of points in time (5 points in time shown: t−4, t−3, t−2, t−1, t).

The neural network 500 shown in FIG. 5 has an input layer 501 having five sub-input layers 521, 522, 523, 524 and 525 that respectively contain a predefinable number of input computer elements, to which input quantities $u_{t-4}$, $u_{t-3}$, $u_{t-2}$, $u_{t-1}$, $u_t$ can be applied at predefinable points in time t−4, t−3, t−2, t−1, t, i.e. time row values with predefined time steps described below.

Input computer elements, i.e. input neurons, are connected via variable connections to neurons of a predefinable number of hidden layers 505 (5 hidden layers shown).

Neurons of a first 531, a second 532, a third 533, a fourth 534 and a fifth 535 hidden layer are thereby connected respectively to neurons of the first 521, second 522, third 523, fourth 524 and fifth 525 sub-input layer.

The connections between the first 531, second 532, third 533, fourth 534 and fifth 535 hidden layer and the first 521, second 522, third 523, fourth 524 and fifth 525 sub-input layer respectively are the same in each instance. The weightings of all connections are respectively contained in a first connection matrix $B_1$.

The outputs of neurons of the first hidden layer 531 are also connected to inputs of neurons of the second hidden layer 532 according to a structure defined by a second connection matrix $A_1$. The outputs of neurons of the second hidden layer 532 are connected to inputs of neurons of the third hidden layer 533 according to a structure defined by the second connection matrix $A_1$. The outputs of neurons of the third hidden layer 533 are connected to inputs of neurons of the fourth hidden layer 534 according to a structure defined by the second connection matrix $A_1$. The outputs of neurons of the fourth hidden layer 534 are connected to inputs of neurons of the fifth hidden layer 535 according to a structure defined by the second connection matrix $A_1$.

In the hidden layers, the first hidden layer 531, the second hidden layer 532, the third hidden layer 533, the fourth hidden layer 534 and the fifth hidden layer 535, "internal" statuses or "internal" system statuses $s_{t-4}$, $s_{t-3}$, $s_{t-2}$, $s_{t-1}$, and $s_t$ of a dynamic process described by the TDRNN are represented respectively at five successive points in time t–4, t–3, t–2, t–1 and t.

The particulars in the indices in the respective layers respectively indicate the point in time t–4, t–3, t–2, t–1 and t, to which the signals that can be taken or supplied respectively at the outputs of the respective layer refer ($u_{t-4}$, $u_{t-3}$, $u_{t-2}$, $u_{t-1}$, $u_t$).

An output layer 520 comprises five sub-output layers, a first sub-output layer 541, a second sub-output layer 542, a third sub-output layer 543, a fourth sub-output layer 544 and a fifth sub-output layer 545. Neurons of the first sub-output layer 541 are connected to neurons of the first hidden layer 531 according to a structure defined by an output connection matrix $C_1$. Neurons of the second sub-output layer 542 are connected to neurons of the second hidden layer 532 also according to the structure defined by the output connection matrix $C_1$. Neurons of the third sub-output layer 543 are connected to neurons of the third hidden layer 533 according to the output connection matrix $C_1$. Neurons of the fourth sub-output layer 544 are connected to neurons of the fourth hidden layer 534 according to the output connection matrix $C_1$. Neurons of the fifth sub-output layer 545 are connected to neurons of the fifth hidden layer 535 according to the output connection matrix $C_1$. The output quantities for a respective point in time t–4, t–3, t–2, t–1, t can be taken at the neurons of the sub-output layers 541, 542, 543, 544 and 545 ($y_{t-4}$, $y_{t-3}$, $y_{t-2}$, $y_{t-1}$, $y_t$)

The principle that equivalent connection matrices in a neural network exhibit the same values at a respective point in time is referred to as the so-called shared weights principle.

The system known from David E. Rumelhart et al. and referred to as a time delay recurrent neural network (TDRNN) is trained in a training phase such that a respective target quantity $y_t^d$ at a real dynamic system is determined for an input quantity $u_t$. The tupel (input quantity, determined target quantity) is referred to as training datum. A plurality of such training data forms a training data set.

Temporally successive tupels ($u_{t-4}$, $y_{t-4}^d$), ($u_{t-3}$, $y_{t-3}^d$), ($u_{t-2}$, $y_{t-2}^d$) of the points in time (t–4, t–3, t–3, . . . ) of the training data set each exhibit a predefined time step.

The TDRNN is trained with the training data set. An overview of various training methods can likewise be found in the Haykin reference and WO00/08599.

It should be emphasized at this point that only the output quantities $y_{t-4}$, $y_{t-3}$, . . . , $y_t$ at points in time t–4, t–3, . . . , t of the dynamic system 200 can be identified. The "internal" system statuses $s_{t-4}$, $s_{t-3}$, . . . , $s_t$ cannot be observed.

The following cost function E is usually minimized in the training phase:

$$E = \frac{1}{T}\sum_{t=1}^{T}(y_t - y_t^d)^2 \to \min_{f,g} \quad (4)$$

where T refers to a plurality of points in time taken into consideration.

Developments of the neural structure known from David E. Rumelhart et al. and referred to as a time delay recurrent neural network (TDRNN) are known from WO00/55809 and Zimmermann H. G., Neunier R., Grothmann R., "Modelling of Dynamic Systems by Error-Correction-Neural-Networks", in Soofe and Cao (eds.), Forecasting Financial Data, Kluwer Verlag, ISBN 0792376803, 2002 ("Zimmermann H. G. et al.").

The developments from WO00/55809 are particularly suitable for determining future statuses of a dynamic process, which is referred to as "overshooting".

FIG. 1a from WO00/55809 shows a basic structure, on which the developments known from WO00/55809 are based.

The basic structure is a neural network developed over three points in time t, t+1, t+2.

It has an input layer, having a predefinable plurality of input neurons, to which input quantities $u_t$ can be applied at predefinable points in time t, i.e. time row values with predefined time steps as described below.

The input neurons are connected via variable connections to neurons of a predfinable plurality of hidden layers (3 hidden layers shown).

Neurons of a first hidden layer are thereby connected to neurons of the first input layer.

The connection between the first hidden layer and the first input layer has weightings, which are contained in a first connection matrix B.

The outputs of neurons of the first hidden layer are also connected to inputs of neurons of a second hidden layer according to a structure defined by a second connection matrix A. The outputs of neurons of the second hidden layer are connected to inputs of neurons of a third hidden layer according to a structure defined by the second connection matrix A.

In the hidden layers, the first hidden layer, the second hidden layer and the third hidden layer, "internal" statuses or "internal" system statuses $s_t$, $s_{t+1}$, $s_{t+2}$ of the described dynamic process are represented respectively at three successive points in time t, t+1, t+2.

The particulars in the indices in the respective layers respectively indicate the point in time t, t+1, t+2, to which the signals (ut) that can be taken or supplied respectively at the outputs of the respective layer refer.

An output layer 120 has two sub-output layers, a first sub-output layer and a second sub-output layer. Neurons of the first sub-output layer are connected to neurons of the first hidden layer according to a structure defined by an output connection matrix C. Neurons of the second sub-output layer are connected to neurons of the second hidden layer also according to the structure defined by the output connection matrix C.

The output quantities for a respective point in time t+1, t+2 can be taken at the neurons of the sub-output layers ($y_{t+1}$, $y_{t+2}$).

A development of this basic structure from WO00/55809 is shown in FIG. 6.

Developments of the TDRNN structure from Zimmermann H. G. et al., so-called error correction recurrent neural networks (ECRNN), relate to a structurally necessary error correction mechanism, which is integrated as a structural component in a neural structure. FIG. 7 shows a basic structure with corresponding functional equations for an ECRNN.

A further neural structure to describe the dynamic system 200, a neural network referred to as a causal-retro-causal time delay recurrent neural network or causal-retro-causal neural network (CRCNN) is known from WO02/27654.

FIG. 3 shows a basic structure 300 with corresponding functional equations for a CRCNN.

Two neural sub-structures 310, 320 are linked together with this CRCNN. A first internal sub-status $s_t$ (311-314) of the first neural sub-structure 310 and a second internal sub-status $r_t$ (321-324) of the second neural sub-structure 320 are thereby a function according to the following rules of the input quantity $u_t$ (301-304), the first internal sub-status $s_{t-1}$ (311-314), the second internal sub-status $r_{t+1}$ (321-324) and parameter vectors $v_s$, $v_t$, $v_y$:

$$s_t = NN(v_s, s_{t-1}, u_t), \qquad (8)$$

$$r_t = NN(v_r, r_{t+1}, u_t) \qquad (9)$$

$$y_t = NN(v_y, s_t, r_t) \qquad (10)$$

where NN(.) refers to a mapping rule predefined by the neural network.

Connections between the neurons of the CRCNN are weighted. The weightings are combined in parameter vectors vs, vt, vy.

The CRCNN 300 according to FIG. 3 is a neural network developed over four points in time, t−1, t, t+1, t+2) (see TDRNN, FIG. 5).

Essential features of a neural network developed over a finite number of points in time are described in David E. Rumelhart et al. and above in relation to the known TDRNN (see FIG. 5).

An overview of the basic principles of neural networks and the possible applications of neural networks in the economic field can also be found in H. Rehkugler and H. G. Zimmermann,"Neuronale Netze in der Ökonomie, Grundlagen und finanzwirtschaftliche Anwendungen (Neural networks in economics, Basic principles and financial applications)", Verlag Franz Vahlen Munich, ISBN 3-8006-1871-0, pages 3-90, 1994.

The known systems and methods in particular have the disadvantage that they only describe a dynamic system to be described with inadequate accuracy and they are therefore only able to forecast future developments of the system with inadequate accuracy.

This is particularly true of dynamic systems, which are subject to a planning influence, i.e. dynamic systems that are not just purely market-driven.

SUMMARY OF THE INVENTION

One possible object of the invention is therefore to specify a method for determining a future system response of a dynamic system, said method not being subject to the disadvantages of the known systems and methods, in particular their inaccuracies.

This object maybe achieved by the method and by the computer program for determining a future system response of a dynamic system.

With the method for determining a future system response of a dynamic system, a known system response of the dynamic system is used to determine an approximation of the future system response by a similarity comparison or similarity analysis.

The future system response is then determined using the approximation of the future system response of the dynamic system and a neural network structure (causality analysis), with the approximation of the future system response of the dynamic system being fed to the neural network structure as an input quantity and an output quantity of the neural network structure representing the future system response.

Graphically speaking, the method represents a combination of a similarity analysis and a causality analysis using a neural network structure.

The similarity analysis is thereby used to determine an approximation of a future (anticipated) system response from a historic system response. Based on this approximation the future system response is then defined or forecast in the manner of a subsequent correction using the neural network structure.

This two-step or combined procedure, namely the determination of an approximation by a similarity analysis followed by subsequent correction using a neural network structure, is particularly suitable for forecasting the system response of so-called human controlled systems (HCS).

Such HCS are systems that are subject to a controlling influence and/or an influence based on planning intervention.

Examples of such HCS are energy consumption, power consumption or gas consumption or a corresponding energy consumption response.

Energy or power/gas consumption is thereby a function of energy supply and demand. The interaction of supply and demand underlies (economic) legalities or mechanisms in the form of market mechanisms. However it is possible to intervene in the interaction or the market dynamic, in other words the system, by planning and providing supply quantities correspondingly.

Neural network structures that are particularly suitable for an effect-cause (causality) analysis should in particular be used with the method (in the context of the causality analysis).

Dynamic systems are usually formulated as cause-effect relationships (see information re FIG. 2, equations (1) to (3)), which can be mapped by the neural structures known from the Haykin reference, David E. Rumelhart et al. or WO00/55809. These cause-effect relationships are expressed in these neural structures in that an information flow generated in these neural structures is directed temporally forward, in other words from the past into the future. This is referred to as a forward response. Causes in input quantities $u_t$ at predefined points in time (t−2), (t−1), . . . result in (perceptible) effects in output quantities $y_t$ at the point in time (t or t+1). The input quantities $u_t$ are thereby mapped by the neural cause-effect structure onto the output quantities $y_t$.

This "forward directed" information flow is particularly suitable for taking into consideration the influence of market mechanisms.

These one-dimensional (forward directed) structures for the cause-effect relationships can be extended to include a neural sub-structure that carries out an effect-cause analysis and therefore provides a causal synthesis.

With this (effect-cause) extension structure or effect-cause structure an information flow is generated that is directed temporally backward, i.e. an information flow directed from the future into the past. This is referred to as a backward response. Effects in output quantities $y_t$ at the point in time (t) "result" or have their causes in input quantities $u_t$ at the point in time (t−1), (t−2), . . . . In the opposite fashion to the cause-effect structure, output quantities $y_t$ (as input quantities of the extension structure) are thereby mapped onto the input quantities $u_t$ (as output quantities of the extension structure).

This "backward directed" information flow is particularly suitable for taking into consideration the planning and/or controlling influence.

The method is particularly suitable for forecasting the future system response of the dynamic system. This forecast can be derived from the future system response determined.

The computer program with program code is set up to carry out all steps according to the method when the program is executed on a computer.

The computer program product with program code stored on a machine-readable medium is set up to carry out all steps according to the method when the program is executed on a computer.

The arrangement and the computer program with program code, set up to carry out all steps according to the method, when the program is executed on a computer, and the computer program product with program code stored on a machine-readable medium, set up to carry out all steps according to the method, when the program is executed on a computer, are particularly suitable for carrying out the method or one of its developments described below.

The described software solutions can thereby also be implemented in a decentralized or distributed fashion, i.e. parts of the computer program or parts of the computer program product can operate on or be executed by different (distributed) computers or be stored on different storage media—even as standalone partial solutions.

The developments described below relate to the method and to the computer program with program code as well as the computer program product.

The Method described below can be implemented in both software and hardware, for example using a specific electrical circuit.

The method described below can also be implemented by a computer-readable storage medium, on which the computer program with program code that executes the method is stored.

The method described below can also be implemented by a computer program product, having a storage medium, on which the computer program with program code means that executes the method is stored.

In a development the neural network structure has two sub-structures that are linked to each other.

A first neural substructure is tailored such that its first mapping response describes a forward response of the dynamic system.

The first "forward directed" neural network structure, which can be mapped by the neural structures known from the Haykin reference, David E. Rumelhart et al. or WO00/55809, is particularly suitable for simulating or identifying cause-effect relationships (see information relating to FIG. 2, equations (1) to (3)).

This cause-effect relationship is expressed in this first neural sub-structure in that an information flow generated in said first neural sub-structure is directed temporally forward, i.e. from the past into the future. This is referred to as a forward response. Causes in input quantities $u_t$ at past points in time $(t-2), (t-1), \ldots$ result in (perceptible) effects in output quantities $y_t$ at the point in time (t or t+1). The input quantities $u_t$ are thereby mapped by the neural cause-effect structure onto the output quantities $y_t$.

The second neural sub-structure is tailored such that its second mapping response describes a backward response of the dynamic system.

This second "backward directed" neural network structure, which can be mapped by corresponding neural structures known from the Haykin reference, David E. Rumelhart et al. or WO00/55809, is particularly suitable for simulating or identifying effect-cause relationships.

This second "backward directed" neural sub-structure is therefore particularly suitable for carrying out an effect-cause analysis, to provide a causal synthesis.

With this (effect-cause) sub-structure, an information flow is generated that is directed temporally backward, i.e. an information flow directed from the future into the past. This is referred to as a backward response. Effects in output quantities $y_t$ at the point in time (t) "result" or have their causes in input quantities $u_t$ at the point in time $(t-1), (t-2), \ldots$ In the opposite fashion to the cause-effect structure, output quantities $y_t$ (as input quantities of the second neural sub-structure) are thereby mapped onto the input quantities $u_t$ (as output quantities of the second neural sub-structure).

The first "forward directed" neural sub-structure is also particularly suitable for taking an influence of market mechanisms on the dynamic system into consideration.

The second "backward directed" neural sub-structure is particularly suitable for taking a planning influence on the dynamic system into consideration.

Based on this "forward directed" cause-effect relationship (causality) and the "backward directed" effect-cause relationship (retro-causality), the neural structure comprising a first and second neural sub-structure can be referred to as a causal-retro-causal neural network.

In a development the first and/or the second neural sub-structure is/are a neural network developed over a plurality of points in time, for example a TDRNN, or neural networks developed over a plurality of points in time, in which a temporal dimension of the dynamic system described is developed as a spatial dimension.

It can also be expedient for the first and/or second neural sub-structure to be configured as an error correction recurrent neural network (ECRNN). The basic principles of such ECRNNs are described in Zimmermann H. G. et al. and can be incorporated correspondingly in the neural sub-structures.

In one embodiment there is provision for determining the known system response of the dynamic system using historic system data.

The approximation of the future system response of the dynamic system can be determined such that the known system response is subdivided into segments of predefinable durations, such as a day or an hour. Associated segment system responses are then determined for the segments.

Defined segments with the respective associated segment system responses can be selected from the segments. The approximation can be determined using these selected segments and the selected associated segment system responses taking into consideration a calendar effect.

In one embodiment segments are selected, the associated segment system response of which exhibits a significant response.

When determining the approximation of the future system response of the dynamic system using the selected segment system response, it is possible to interpolate a system response between the selected segment system responses and/or determine the mean and/or insert historic segment system response(s).

In embodiments of method is used to forecast energy consumption, in particular the consumption of a quantity of gas. The method can also be used correspondingly to forecast power consumption.

Other use scenarios are possible, for example in economic systems (financial services, banks, insurance) or industrial systems (production systems, industrial units, logistics systems).

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIGS. 1a and 1b show outlines of a two-step procedure for energy forecasting (1a: first step: similarity analysis; 1b: second step: causality analysis) according to one exemplary embodiment;

FIG. 2 shows an outline of a general description of a dynamic system;

FIG. 6 shows an outline of a development of a TDRNN suitable for "overshooting";

FIG. 7 shows an outline of an ECRNN with underlying functional equations.

DETAILED DESCRIPTION OF THE PREFERRED EMBODIMENT

Figure 3:
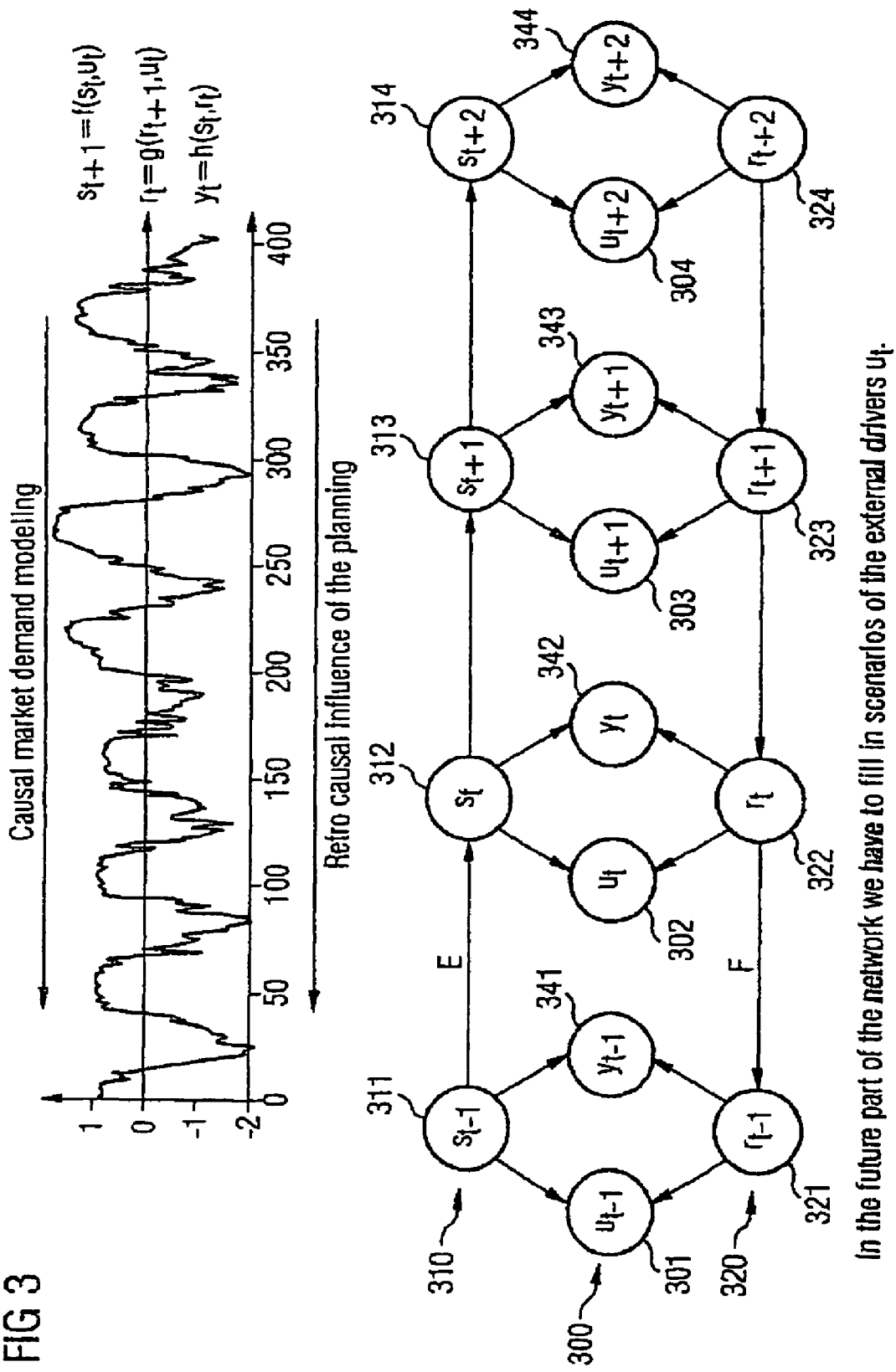
FIG. 3 shows an outline of a CRCNN with underlying functional equations.

Reference will now be made in detail to the preferred embodiments of the present invention, examples of which are illustrated in the accompanying drawings, wherein like reference numerals refer to like elements throughout.

Exemplary Embodiment

Energy/Gas Consumption Forecast

Figure 4:
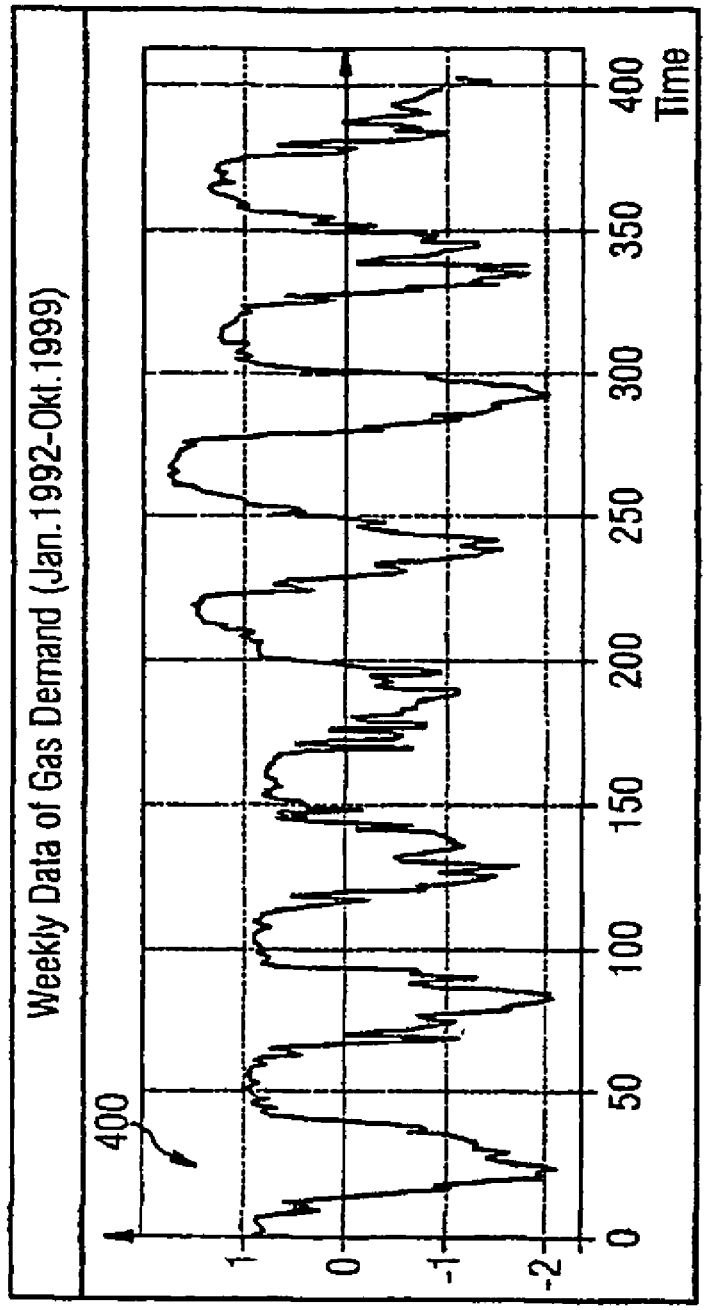
FIG. 4 shows an outline of a historic pattern of energy/gas consumption (weekly data for 01/92-10/99)

Task definition (FIG. 4)

FIG. 4 shows a question 410 from an economic environment, which is resolved by the procedure described in the context of the following exemplary embodiment of the invention.

A forecast is required for energy consumption or gas consumption for a future year 2001, based on a predefined scenario of temperature trends for the forecast period.

FIG. 4 shows a historic pattern 400 of energy/gas consumption based on weekly consumption data for a period 01/92-10/99 by way of an example of an energy consumption pattern.

Gas consumption is thereby generally a function of customer demand (market mechanism) and planning strategy (cost minimization) for gas storage by supply companies (planning influence) 420.

Procedure (FIGS. 1a and 1b)

FIGS. 1a and 1b show a procedure used for the energy consumption forecast 2001.

FIG. 1a shows a first step in the procedure, a similarity analysis (approximation step). FIG. 1b shows a second step in the procedure, a causality analysis (subsequent correction). A result of the first step is both an output and input quantity for the second step.

Step 1: Similarity Analysis (FIG. 1a, 110)

In the course of the similarity analysis 110 a historic, known energy consumption pattern, in this instance the energy consumption for the year 2000 111, is subdivided into time segments of a day in each instance, referred to as daily slices.

Significant energy consumption trends 120, 121, which can comprise one or a plurality of associated daily slices, are also selected from the historic energy consumption pattern 200.

Significant energy consumption trends 120, 121 can thereby be trends which show an extraordinary pattern, such as energy consumption peaks. Also of significance are energy consumption trends on significant dates such as holiday dates (Christmas, Easter) or the start of a holiday.

Such energy consumption trends thus selected are transferred or projected 130, 131 into the year to be forecast 2001 or the period to be forecast 2001 based on the corresponding daily slices taking into consideration a calendar effect.

The calendar effect refers to the fact that a "daily slice" or the energy consumption pattern at Easter 2000 (historic) for example can be used as a forecast, approximated "daily slice" or energy consumption pattern for Easter 2001 (forecast approximation) (despite the date difference between Easter 2000 and Easter 2001).

The transfer to 2001 proceeds correspondingly 130, 131 with all the selected significant energy consumption patterns 120, 121 from 2000.

(Pattern) gaps 140 occurring in the approximated, forecast energy consumption pattern for 2001 can then be closed.

This can be done by interpolation between the significant energy consumption patterns 120, 121 from 2000 projected into the year 2001 and/or by determining a mean and/or by using plausible historic consumption patterns.

The result of this first step, the similarity analysis 110, is an approximation of the forecast energy consumption pattern for 2001 112.

Step 2: Causality Analysis (FIG. 1b, 150)

This approximated, forecast energy consumption pattern 112, 152 now serves as an output quantity for the second step, the causality analysis 150. The result of the causality analysis 150 is the required energy consumption forecast 2001 153.

The causality analysis 150 is carried out using a neural network structure, a so-called causal-retro-causal neural network (CRC NN) 151 or 130 (FIG. 3).

Neural Network Structure—CRC NN (FIG. 3)

FIG. 3 shows an underlying structure 300 with corresponding functional equations for a CRCNN.

With this CRCNN two neural sub-structures 310, 320 are linked together. A first internal sub-status $s_t$ (311-314) of the first neural sub-structure 310 and a second internal sub-status $r_t$ (321-324) of the second neural sub-structure 320 are thereby a function according to the following rules of the input quantity $u_t$ (301-304), the first internal sub-status $s_{t-1}$ (311-314), the second internal sub-status $r_{t+1}$ (321-324) and parameter vectors $v_s, v_r, v_y$:

$$s_t = NN(v_s, s_{t-1}, u_t), \tag{8}$$

$$r_t = NN(v_r, r_{t+1}, u_t), \tag{9}$$

$$y_t = NN(v_y, s_t, r_t) \tag{10}$$

where NN(.) refers to a mapping rule predefined by the neural network.

Connections between the neurons of the CRCNN are weighted. The weightings are combined in parameter vectors $v_s, v_r, v_y$.

Figure 5:
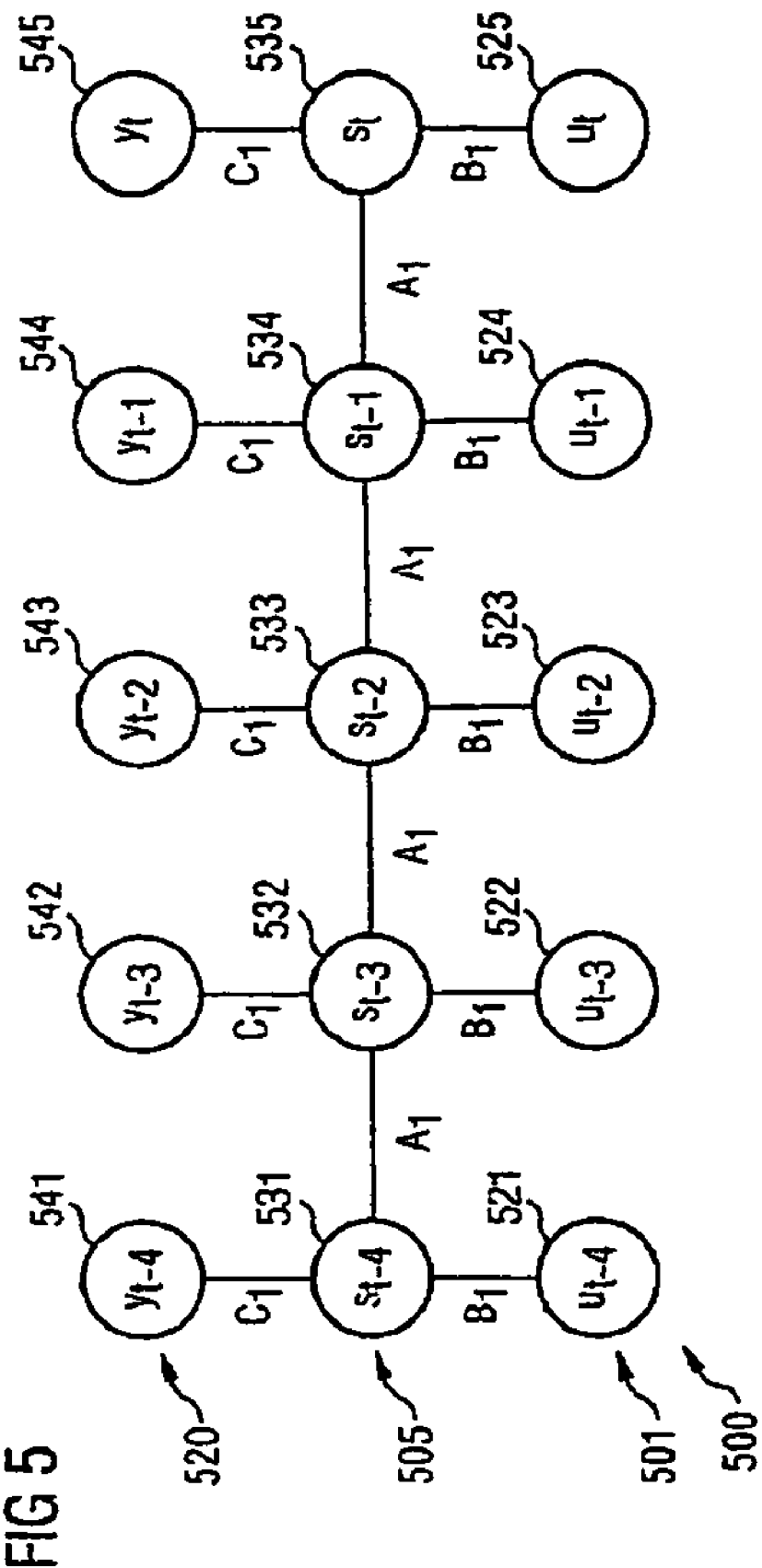
FIG. 5 shows an outline of an arrangement of a TDRNN, developed with a finite number of statuses over time.

The CRCNN 300 according to FIG. 3 is a neural network developed over four points in time, t−1, t, t+1, t+2) (see TDRNN, FIG. 5).

Essential features of a neural network developed over a finite number of points in time are described in David E. Rumelhart et al. and above in relation to the known TDRNN (see FIG. 5).

The input quantity $u_t$ (301-304) is thereby the result of the similarity analysis from the first step (110), i.e. the approximated pattern of forecast energy consumption 112, 152, as determined in the first step.

The output quantity $y_t$ (341-344) is thereby the required result of the causality analysis of the second step (150), i.e. the subsequently corrected pattern of the forecast energy consumption 153 determined in the second step.

Possible implementations of the exemplary embodiments described above can be carried out with the program SENN, version 2.3.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV,* 69 USPQ2d 1865 (Fed. Cir. 2004).

The invention claimed is:

1. A method for determining a future response of a dynamic system, comprising:
    determining an approximation of the future response using a known response of the dynamic system, performing a comparison and using a similarity analysis;
    feeding the approximation of the future system response to a neural network as an input quantity;
    determining the future response using the approximation of the future response, using the neural network and performing a causality analysis;
    producing an output quantity from the neural network representing the future response of the dynamic system; and
    displaying the output quantity on a display device using a time axis.

2. The method according to claim 1, wherein
    the neural network has first and second linked neural sub-structures,
    the first neural sub-structure has a first mapping response that describes a forward response of the dynamic system, and
    the second neural sub-structure has a second mapping response that describes a backward response of the dynamic system.

3. The method according to claim 2, wherein
    at least one of the first and second neural sub-structures is a neural network developed over one or a plurality of points in time.

4. The method according to claim 1, wherein
    the dynamic system responds based on market mechanisms and planning influences.

5. The method according to claim 4, wherein
    the dynamic system is a human-controlled system.

6. The method according to claim 4, wherein
    the neural network has first and second linked neural sub-structures,
    the first neural sub-structure has a first mapping response that describes a forward response of the dynamic system,
    the second neural sub-structure has a second mapping response that describes a backward response of the dynamic system, and
    the first neural sub-structure takes into consideration an influence of market mechanisms on the dynamic system and/or the second neural sub-structure takes into consideration a planning influence on the dynamic system.

7. The method according to claim 1, wherein
    the neural network is a causal-retro-causal network.

8. The method according to claim 1, wherein
    the known response of the dynamic system is determined using historic system data.

9. The method according to claim 1, wherein the approximation of the future response of the dynamic system is determined by:
    dividing a time required for the known response into segments of a predefined duration,
    determining a segment response of the dynamic system for each segment, and
    determining the approximation using selected segments with respectively associated segment responses and a calendar effect.

10. The method according to claim 9, wherein
    segments are selected that have a relatively large segment response.

11. The method according to claim 9, wherein in determining the approximation of the future response of the dynamic system:
    the future response is determined by interpolating between the segment responses of the selected segments,
    a mean is determined of the segment responses of the selected segments, and/or
    at least one historic segment response is considered together with the segment responses of the selected segments.

12. The method according to claim 1, further comprising using the future response of the dynamic system as a forecast.

13. The method according to claim 1, further comprising using the future response of the dynamic system to forecast energy consumption.

14. The method according to claim 1, further comprising using the future response of the dynamic system to forecast gas fuel consumption.

15. The method according to claim 5, wherein
    the neural network has first and second linked neural sub-structures,
    the first neural sub-structure has a first mapping response that describes a forward response of the dynamic system,
    the second neural sub-structure has a second mapping response that describes a backward response of the dynamic system,
    the first neural sub-structure takes into consideration an influence of market mechanisms on the dynamic system, and
    the second neural sub-structure takes into consideration a planning influence on the dynamic system.

16. The method according to claim 15, wherein the approximation of the future response of the dynamic system is determined by:
    dividing a time required for the known response into segments of a predefined duration,
    determining a segment response of the dynamic system for each segment, and
    determining the approximation using selected segments with respectively associated segment responses and a calendar effect.

17. The method according to claim 16, wherein in determining the approximation of the future response of the dynamic system:
    the future response is determined by interpolating between the segment responses of the selected segments.

18. The method according to claim 16 wherein in determining the approximation of the future response of the dynamic system:
   a mean is determined of the segment responses of the selected segments.

19. The method according to claim 16, wherein in determining the approximation of the future response of the dynamic system:
   at least one historic segment response is considered together with the segment responses of the selected segments.

20. A computer readable medium storing a program for controlling a computer to perform a method for determining a future response of a dynamic system, the method comprising:
   determining an approximation of the future response using a known response of the dynamic system, performing a comparison and using a similarity analysis;
   feeding the approximation of the future system response to a neural network as an input quantity;
   determining the future response using the approximation of the future response, using the neural network and performing a causality analysis;
   producing an output quantity from the neural network representing the future response of the dynamic; and
   displaying the output quantity on a display device using a time axis.

21. A method for determining a future response of a dynamic system representing a humans controlled system related to energy consumption, power consumption or gas consumption, the method comprising:
   determining an approximation of the future consumption using a known consumption of the dynamic system, performing a comparison and using a similarity analysis;
   inputting the approximation of the future consumption to a neural network corresponding to the dynamic system;
   determining the future consumption by performing a causality analysis in the neural network, the neural network including a first neural sub-structures yielding a first mapping response, which describes a forward response of the dynamic system taking into consideration an influence of market mechanisms on the dynamic system, and a second neural sub-structure yielding a second mapping response, which describes a backward response of the dynamic system taking into consideration a planning influence on the dynamic system;
   outputting the future consumption of the dynamic system from the neural network in response to input of the approximation of the future consumption; and
   displaying the future consumption on a display device using a time axis.

* * * * *